United States Patent [19]
Watanabe et al.

[11] Patent Number: 5,528,565
[45] Date of Patent: Jun. 18, 1996

[54] MAGNETO-OPTIC RECORDING SYSTEM

[75] Inventors: Isao Watanabe; Koichi Takeuchi; Osamu Ito; Kyosuke Yosimoto; Kunimaro Tanaka; Kazuhiko Tsutsumi, all of Amagasaki, Japan

[73] Assignee: Mitsubishi Denki Kabushiki Kaisha, Tokyo, Japan

[21] Appl. No.: 392,535

[22] Filed: Feb. 23, 1995

Related U.S. Application Data

[62] Division of Ser. No. 186,362, Dec. 23, 1993, abandoned, which is a continuation of Ser. No. 577,484, Sep. 5, 1990, abandoned.

[30] Foreign Application Priority Data

Sep. 5, 1989 [JP] Japan ..... 1-229514
Oct. 3, 1989 [JP] Japan ..... 1-259273
Nov. 16, 1989 [JP] Japan ..... 1-299396
Nov. 21, 1989 [JP] Japan ..... 1-304279

[51] Int. Cl.$^6$ ..... G11B 11/00
[52] U.S. Cl. ..... 369/13; 369/110; 360/59
[58] Field of Search ..... 369/13, 14, 116, 369/110; 360/59, 114; 365/122; 428/694 ML, 694 R

[56] References Cited

U.S. PATENT DOCUMENTS

| 5,287,334 | 2/1994 | Iwabuchi et al. | 369/13 |
| 5,369,628 | 11/1994 | Yoshimoto et al. | 369/13 |
| 5,392,262 | 2/1995 | Finkelstein et al. | 369/13 |
| 5,392,263 | 2/1995 | Watanabe et al. | 369/13 |

*Primary Examiner*—Georgia Y. Epps
*Assistant Examiner*—Tan Dinh
*Attorney, Agent, or Firm*—Wolf, Greenfield & Sacks

[57] ABSTRACT

A magneto-optic recording system uses a unit recording medium having on a substrate a first magnetic layer whose Curie temperature is low and also having on the first magnetic layer a second magnetic layer whose Curie temperature is high. The system heats a spot on the medium with a heating device. The system may employ two such unit recording media, each having the second magnetic layer magnetized in one direction. The two unit recording media are superposed on each other and formed integrally so as to obtain a magneto-optic recording medium in which the amount of information recorded and the recording speed are doubled. In addition, a light-emitting device and a magnetic field generator are added to the magneto-optic recording medium to obtain a compact magneto-optic recording system with a low level of power consumption.

3 Claims, 13 Drawing Sheets

MAGNETO-OPTIC RECORDING SYSTEM

This application is a division of application Ser. No. 08/186,362 filed Dec. 23, 1993, abandoned, which is a continuation of application Ser. No. 07/557,484 filed Sep. 5, 1990, abandoned.

BACKGROUND OF THE INVENTION

1. Field of the Invention

The present invention relates to a magneto-optic recording medium for recording information by applying a light beam and a magnetic field thereto, a method of manufacturing the magneto-optic recording medium, and a magneto-optic recording system for recording information on the magneto-optic recording medium. More particularly, the present invention concerns a magneto-optic recording medium wherein a first magnetic layer whose direction of magnetization is reversible and a second magnetic layer whose direction of magnetization is irreversible are laminated on a substrate, a method of manufacturing the magneto-optic recording medium, and a magneto-optic recording system for recording information on the magneto-optic recording medium.

2. Description of the Related Art

FIG. 12 is an enlarged cross-sectional view of a conventional magneto-optic recording medium in which a single magnetic layer is laminated on a substrate. A magneto-optic recording medium D comprises a substrate 2, formed of glass or a plastic, and a single magnetic layer 1 formed on one Surface of the substrate 2. This magnetic layer 1 exhibits vertical magnetic anisotropy, and if a light beam is applied to the magnetic layer 1 so as to increase its temperature up to its Curie temperature, the direction of magnetization of the magnetic layer 1 can be set in correspondence with the direction of a magnetic field applied from the outside to the magneto-optic recording medium D. That is, by reversing the direction of the magnetic field applied to the magneto-optic recording medium D in connection with the recording or erasing of information, it is possible to record information on the magneto-optic recording medium D.

FIG. 13 is a schematic enlarged cross-sectional view of another conventional magneto-optic recording medium D. The magneto-optic recording medium D comprises two unit recording media A, B. One (the other) unit recording medium A (B) is constituted by a substrate 2A (2B) formed of glass or a plastic and a magnetic layer 3A (3B) formed on one surface of the substrate 2A (2B). The one unit recording medium A and the other unit recording medium B are formed integrally by being laminated on each other with their respective magnetic layers 3A, 3B abutting each other via an adhesive layer AD. Both of these magnetic layers 3A, 3B exhibit vertical magnetic anisotropy and are arranged such that if a light beam is applied to the magnetic layers 3A, 3B so as to increase their temperatures up to their Curie temperatures, the direction of magnetization of the magnetic layers 3A, 3B is reversed in correspondence with the direction of the magnetic field applied from the outside to the magneto-optic recording medium D. That is, by reversing the direction of the magnetic field applied to the magneto-optic recording medium in connection with the recording or erasing of information, it is possible to record or erase information with respect to the magneto-optic recording medium D.

FIGS. 14 and 15 are schematic perspective views of magneto-optic recording systems for recording information on the above-described magneto-optic recording medium D. In FIG. 14, a light-emitting element LD for emitting a light beam is disposed on one surface of the magneto-optic recording medium D in the vicinity of an edge thereof, while a permanent magnet MG capable of reversing a magnetic pole surface by means of a motor M is disposed on the other surface thereof in the vicinity of an edge thereof so as to apply its magnetic field to the magneto-optic recording medium D. The motor M is arranged to be driven in response to an output of a driving circuit DR to which a signal concerning the recording or erasing of information is inputted.

When effecting the recording or erasing of information by means of such a magneto-optic recording system, the magneto-optic recording medium D is first driven. Then, a light beam LB is projected onto the magneto-optic recording medium D, and a signal concerning the recording or erasing of information is inputted to the driving circuit DR. The temperature of the portion of the magneto-optic recording medium D to which position the light beam LB has been projected becomes high owing to the projection of the light beam LB thereto, whereas there occurs a drop in the temperature of the portion of the magneto-optic recording medium D to which the light beam LB is no longer projected owing to the rotation of the magneto-optic recording medium D. Furthermore, the rotating direction of the motor M changes in relation to the signal concerning the recording or erasing of information as indicated by the arrows. In other words, the direction of a magnetic field which the permanent magnet MG applies to the magneto-optic recording medium D reverses. The magnetic layer 1 whose temperature has reached the Curie temperature is magnetized in the direction of the magnetic field being applied at that time. For instance, when erasing information, the magnetic layer 1 is magnetized in an opposite direction to the direction of magnetization of the substrate 2. Meanwhile, when recording information, the magnetic layer 1 is magnetized in the same direction as that of the substrate 2.

In FIG. 15, the light-emitting element LD is disposed on one surface side of the magneto-optic recording medium D in the vicinity of an edge thereof in the same way as shown in FIG. 14. Meanwhile, an electromagnet in which an exciting coil WD is wound around an elongated rectangular magnet yoke MY is disposed on the other surface side thereof in the vicinity of an edge thereof and is arranged to apply a magnetic field to the magneto-optic recording medium D. An output of the driving circuit DR to which the signal concerning the recording or erasing of information is inputted is applied to the exciting coil WD. The magneto-optic recording system thus arranged excites the exciting coil WD in connection with the recording or erasing of information by means of the driving circuit DR, thereby reversing the direction of the magnetic field applied to the magneto-optic recording medium D in correction with the recording or erasing of information. Then, information is recorded in the magnetic layer 1 through the same operation as that of the magneto-optic recording system shown in Fig. 14.

Meanwhile, a magneto-optic recording medium D shown in FIG. 16 has been developed to overcome the drawback encountered in reversing the direction of a magnetic field applied to the magneto-optic recording medium described above. This magneto-optic recording medium D comprises the substrate 2 formed of glass or a plastic, a first magnetic layer 3 formed on one surface of the substrate 2 and a second magnetic layer 4 laminated on the first magnetic layer 3. Both the first and second magnetic layers 3, 4 exhibit vertical magnetic anisotropy, and the first magnetic layer 3 is coupled with the second magnetic layer 4 with an exchange coupling force acting therebetween. This second magnetic layer 4 is magnetized in one direction and its direction of magnetization is irreversible, while the direction of magnetization of the first magnetic layer 3 is reversible. In addition, the Curie temperatures $T_{C1}$, $T_{C2}$ of the first and second magnetic layers 3, 4 are set in such a manner that $T_{C1}<T_{C2}$. If it is assumed that amounts of shift of a reversed magnetic field obtained from the exchange coupling force acting between the first and second magnetic layers 3, 4 are $H_{w1}$, $H_{w2}$, and the bias magnetic field (Hb>0) at the time of recording information is $H_b$, then coersive forces $H_{C1}$, $H_{C2}$ of the first and second magnetic layers 3, 4 at ordinary temperature are provided as $H_{C1}>H_{w1}+H_b$, $H_{C2}>Hw_{2+}H_b$, respectively.

When recording information on the magneto-optic recording as described above, it is necessary to reverse the direction of magnetization of the magnetic layer 1 by reversing the direction of the magnetic field being applied to the magneto-optic recording D. For that reason, when reversing the magnetic polarity of the permanent magnet MG by using the motor M, a space for providing the motor M and a space for rotating the permanent magnet MG are required, and driving electric power for the motor M is required. Furthermore, the direction of the magnetic field reverses at low speed.

Meanwhile, when reversing the direction of the magnetic field by reversing the direction of flow of electric current for the exciting coil WD, it is possible to reverse the direction of the magnetic field at high speed. However, since the exciting coil WD is large in size with an elongated rectangular configuration, large exciting electric power is required, and a space for preventing the generation of heat is also required. Accordingly, with either of the structures described above, there has been the problem that it is impossible to reduce power consumption of the magneto-optic recording system and make the system compact in size.

SUMMARY OF THE INVENTION

Accordingly, an object of the present invention is to provide a method of recording information without reversing the direction of a magnetic field applied to a magneto-optic recording medium and of doubling the recording speed, to provide a magneto-optic recording system capable of reducing the power consumption and of being made compact, and to provide a magneto-optic recording medium capable of doubling the amount of recording information.

To this end, in accordance with one aspect of the invention, there is provided a method of manufacturing a magneto-optic recording medium comprising the steps of: heating by heating means a unit recording medium having on a substrate a first magnetic layer whose Curie temperature is low and also having on the first magnetic layer a second magnetic layer whose Curie temperature is high; and imparting a magnetic field to the unit recording medium by magnetic field generating means, thereby magnetizing the second magnetic layer in a fixed direction.

In accordance with another aspect of the invention, there is provided a magneto-optic recording medium comprising: two unit recording media laminated in two layers and each having a first magnetic layer which exhibits magnetic anisotropy and whose direction of magnetization is reversible and also having a second magnetic layer which exhibits magnetic anisotropy and whose direction of magnetization is irreversible, the first magnetic layer and the second magnetic layer being laminated, wherein directions of magnetization of the second magnetic layers of the unit recording media are set in the same direction.

In accordance with still another aspect of the invention, there is provided a magneto-optic recording system comprising: a unit recording medium in which first magnetic layer which exhibits magnetic anisotropy and whose direction of magnetization is reversible and a second magnetic layer which exhibits magnetic anisotropy and whose direction of magnetization is irreversible are laminated; light beam projecting means for projecting a light beam onto the unit recording medium; and magnetic field generating means for applying a magnetic field oriented in a fixed direction to the first magnetic layer, the magnetic field generating means being disposed adjacent to a side of the unit recording medium where the light beam is projected.

Other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the preferred embodiments of the present invention.

Figure 1:
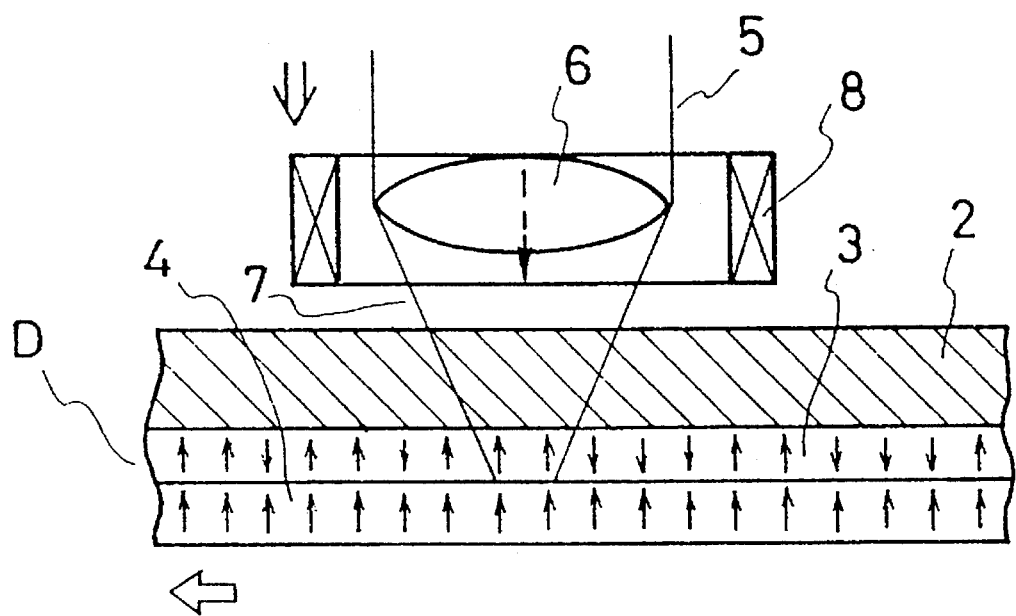
FIG. 1 is a cross-sectional view schematically illustrating essential portions of a magneto-optic recording system in accordance with a first embodiment of the present invention.

FIG. 1 is a schematic cross-sectional view of essential portions of a magneto-optic recording system in accordance with a first embodiment of the present invention with a magneto-optic recording medium D loaded therein. The magneto-optic recording medium D loaded in the magneto-optic recording system comprises a substrate 2 formed of glass or a plastic, a first magnetic layer 3 formed on one surface of the substrate 2, and a second magnetic layer 4 formed on an upper surface of the first magnetic layer 3. Both of these first and second magnetic layers exhibit vertical magnetic anisotropy in the thicknesswise direction of the layers, and the second magnetic layer 4 is coupled with the first magnetic layer 3 with an exchange coupling force acting therebetween. The direction of magnetization of the second magnetic layer 4 is not reversed during the recording of information, and is constantly held in a fixed direction. Curie temperatures $T_{C1}$, $T_{C2}$ of the first and second magnetic layers 3, 4 are set in such a manner that $T_{C1} < T_{C2}$. If it is assumed that amounts of shift of a reversed magnetic field obtained from the exchange coupling force of the first and second magnetic layers 3, 4 are $H_{W1}$, $H_{W2}$, and the bias magnetic field (Hb>0) at the time of recording information is $H_b$, coersive forces $H_{C1}$, $H_{C2}$ of the first and second magnetic layers 3, 4 are provided as $H_{C1} > H_{W1} + H_b$, $H_{C2} > H_{W2} + H_b$, respectively.

Figure 2:
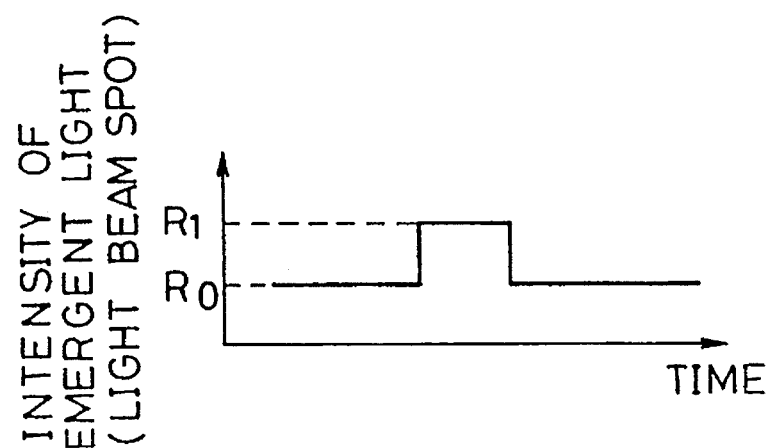
FIG. 2 is a waveform diagram illustrating changes in the intensity of a light beam emergent from a light-emitting element.

The magneto-optic recording system is arranged such that an objective lens 6 for transmitting the emergent light 5 from an unillustrated light-emitting element is disposed on one surface side of the thus-arranged magneto-optic recording medium D in the vicinity of an edge thereof, and a light beam 7 condensed by the objective lens 6 is applied to the magneto-optic recording medium D. A magnetic field generator 8 (a magnetic field generating means) constituted by a cylindrical coil is disposed around the outer periphery of the objective lens 6 concentrically with the objective lens. The direction of the magnetic field of the magnetic field generator 8 is made constantly opposite to the direction of the magnetic field of the second magnetic layer 4 of the magneto-optic recording medium D, and an arrangement is provided so that its direction will not be reversed. The intensity of the light beam made emergent from the light-emitting element is subjected to the modulation of optical intensity in two stages between a high level shown by $R_1$ and an intermediate level shown by $R_0$, as shown in FIG. 2.

A description will now be given of the operation of recording information by using the magneto-optic recording system thus arranged.

First, the magneto-optic recording medium D is rotated in the direction of the outline arrow. When recording information "0", i.e., when setting the direction of magnetization of the first magnetic layer 3 in the downward direction as indicated by the arrow, the intensity of the emergent light 5 of the light-emitting element projected onto the magneto-optic recording medium D is set to $R_1$. Then, the temperature of the light beam 7 becomes sufficiently high to enable the first magnetic layer 3 to reach the Curie temperature $T_{C1}$. When the portion of the first magnetic layer 3 to which the light beam 7 was being applied is no longer irradiated with the light beam 7 owing to the rotation of the magneto-optic recording medium D, the temperature of the first magnetic layer 3 at the position to which the light beam 7 is no longer applied drops. Now, when the first magnetic layer 3 has reached the high temperature, the coersive force $H_{C1}$ of the first magnetic layer 3 disappears, and the direction of magnetization of the first magnetic layer 3 becomes the direction of the magnetic field of the magnetic field generator 8 (direction of the broken-line arrow), i.e., the downward direction.

Next, when recording information "1", i.e., when setting the direction of magnetization of the first magnetic layer 3 in the upward direction indicated by the arrows, the intensity of the emergent light 5 from the light-emitting element projected onto the magneto-optic recording medium D is set to $R_0$. Then, the portion of the first magnetic layer 3 irradiated with the light beam 7 assumes an intermediate temperature lower than the Curie temperature $T_{C1}$ of the first magnetic layer 3. When the portion of the first magnetic layer 3 to which the light beam 7 was being applied is no longer irradiated with the light beam 7 owing to the rotation of the magneto-optic recording medium D, the temperature of the first magnetic layer 3 at the position to which the light beam 7 is no longer applied drops. Now, when the first magnetic layer 3 has reached the intermediate temperature, the coersive force $H_{C1}$ of the first magnetic layer 3 drops, is subjected to the influence of the exchange coupling force, and the direction of magnetization of the first magnetic layer 3 becomes the direction in which the exchange coupling force is acting, i.e., the upward direction which is the direction of the second magnetic layer 4.

Through such operation, at the time of overwriting, it becomes possible to overwrite (update) information on the recorded information in real time by subjecting the optical intensity of the emergent light to $R_1$ and $R_0$ in correspondence with the binary codes "0" and "1" of information.

With this magneto-optic recording system, it merely suffices to modulate the optical intensity of the emergent light to $R_1$ and $R_0$ in correspondence with the binary codes "0" and "1" of information at the time of overwriting, and it is unnecessary to reverse the direction of the magnetic field. Accordingly, it is possible to impart a magnetic field through the objective lens by means of a magnetic field generator having a simple construction. For this reason, if a comparison is made with the conventional structure in which a magnetic field is applied from the surface side of the magneto-optic recording medium D where the objective lens is not provided, the space required for providing the magnetic generator on the surface side where the objective lens is not provided becomes unnecessary, thereby making it possible to reduce the space and make the system compact as a result. In addition, further conservation of electric power can be attained by using a permanent magnet as the magnetic generator.

Figure 3:
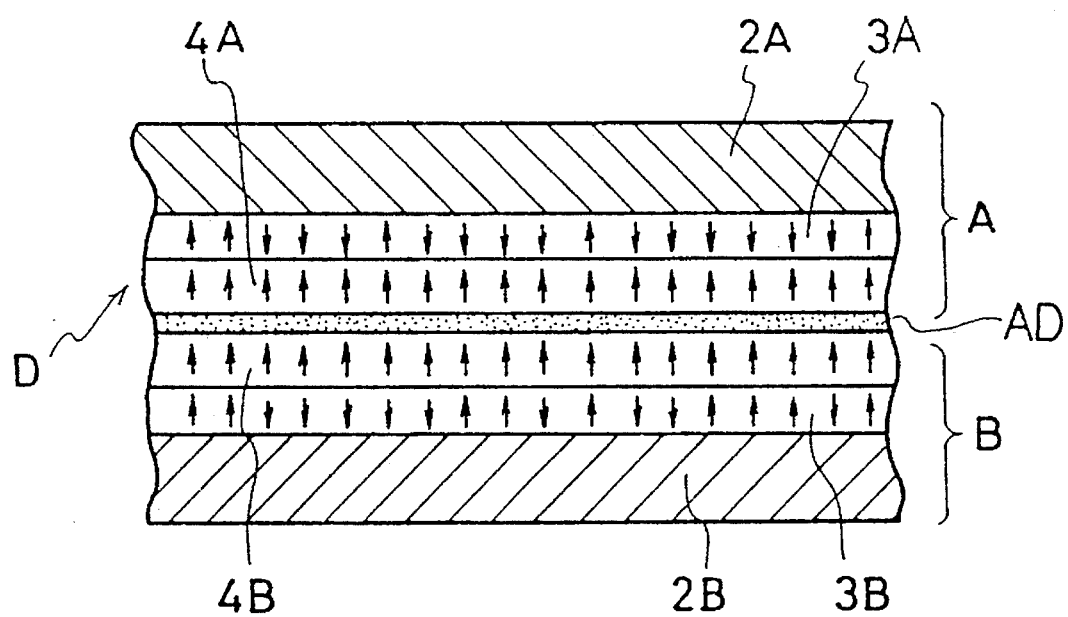
FIG. 3 is an enlarged cross-sectional view of a magneto-optic recording medium in accordance with a second embodiment.

FIG. 3 is a schematic enlarged cross-sectional view of a magneto-optic recording recording medium in accordance with a second embodiment. This magneto-optic recording recording medium comprises two unit recording media A, B. The unit recording medium A (B) includes a substrate 2A (2B) formed of glass or a plastic, a first magnetic layer 3A (3B) formed on one surface of the substrate 2A (2B), and a second magnetic layer 4A (4B) formed on the upper surface of the first magnetic layer 3A (3B). One unit recording medium A and the other unit recording medium B are laminated on each other with their respective second magnetic layers 4A, 4B abutting each other via an adhesive layer AD, this assembly constituting the magneto-optic recording medium D. Both the first magnetic layers 3A, 3B and the second magnetic layers 4A, 4B exhibit vertical magnetic anisotropy in the thicknesswise direction of the layers, and the first magnetic layer 3A (3B) is coupled with the second magnetic layer 4A (4B) by means of an exchange coupling force. The direction of magnetization of the second magnetic layers 4A, 4B is not reversed during the recording of information, and is constantly held in the same fixed direction. In the unit recording medium A, the magnetic field of the second magnetic layer is oriented toward the substrate 2A, while, in the unit recording medium B, the magnetic field of the second magnetic layer is oriented in a direction away from the substrate 2B.

In addition, the Curie temperature $T_{C1}$ of the first magnetic layers 3A, 3B and the Curie temperature $T_{C2}$ of the second magnetic layers 4A, 4B are set in such a manner that $T_{C1}<T_{C2}$. If it is assumed that amounts of shift of a reversed magnetic field obtained from the exchange coupling force acting between the first and second magnetic layers 3A and 4A, and 3B and 4B are $H_{W1}$, $H_{W2}$, and the bias magnetic field (Hb>0) applied to the unit recording media A, B at the time of recording information is $H_b$, then the coersive force $H_{C1}$ of the first magnetic layers 3A, 3B and the coersive force $H_{C2}$ of the second magnetic layers 4A, 4B at ordinary temperature are provided as $H_{C1}>H_{W1}+H_b$, $H_{C2}>H_{W2}+H_b$, respectively.

Such a magneto-optic recording medium D is fabricated by the following procedure: By combining the unit recording media A, B in such a manner that the direction of magnetization of one of the second magnetic layers 4A, 4B is oriented toward the substrate 2, and that of the other one is oriented away from the substrate 2, and by thus setting the directions of magnetization in the same direction, the unit recording media A, B are laminated and secured together. Alternatively, after the two unit recording media A, B are laminated and secured together, a magnetic field acting in one direction may be applied thereto so as to magnetize the respective second magnetic layers 4A, 4B in the same direction, thereby fabricating the magneto-optic recording medium D.

The magneto-optic recording medium D thus arranged operates as follows: By projecting a light beam onto the first magnetic layer 3A or 3B from one surface side of the magneto-optic recording medium D, a magnetic field oriented in an opposite direction to the direction of magnetization of the second magnetic layers 4A, 4B is imparted to the magneto-optic recording medium D. When the first magnetic layer 3A or 3B has thereby reached a predetermined intermediate-level temperature (a first Curie temperature), the direction of the first magnetic layer 3A or 3B is reversed in the same direction as the direction of magnetization of the second magnetic layer 4A or 4B through the exchange coupling force. In addition, when the first magnetic layer 3A or 3B has reached a predetermined second Curie temperature higher than the intermediate-level temperature, the direction of magnetization of the first magnetic layer 3A or 3B is reversed in the same direction as the direction of an unillustrated magnetic field imparted to the magneto-optic recording medium D from the outside.

In this manner, information can be recorded in the first magnetic layer 3A or 3B by reversing the direction of magnetization of the first magnetic layer 3A or 3B. In addition, the magneto-optic recording medium D is composed of the two unit recording media A, B, and information can be recorded independently and simultaneously in the two first magnetic layers 3A, 3B from the opposite surface sides of the magneto-optic recording medium D. Accordingly, the amount of information that can be recorded is doubled, and the effective speed of data transmission can be doubled.

Figure 4:
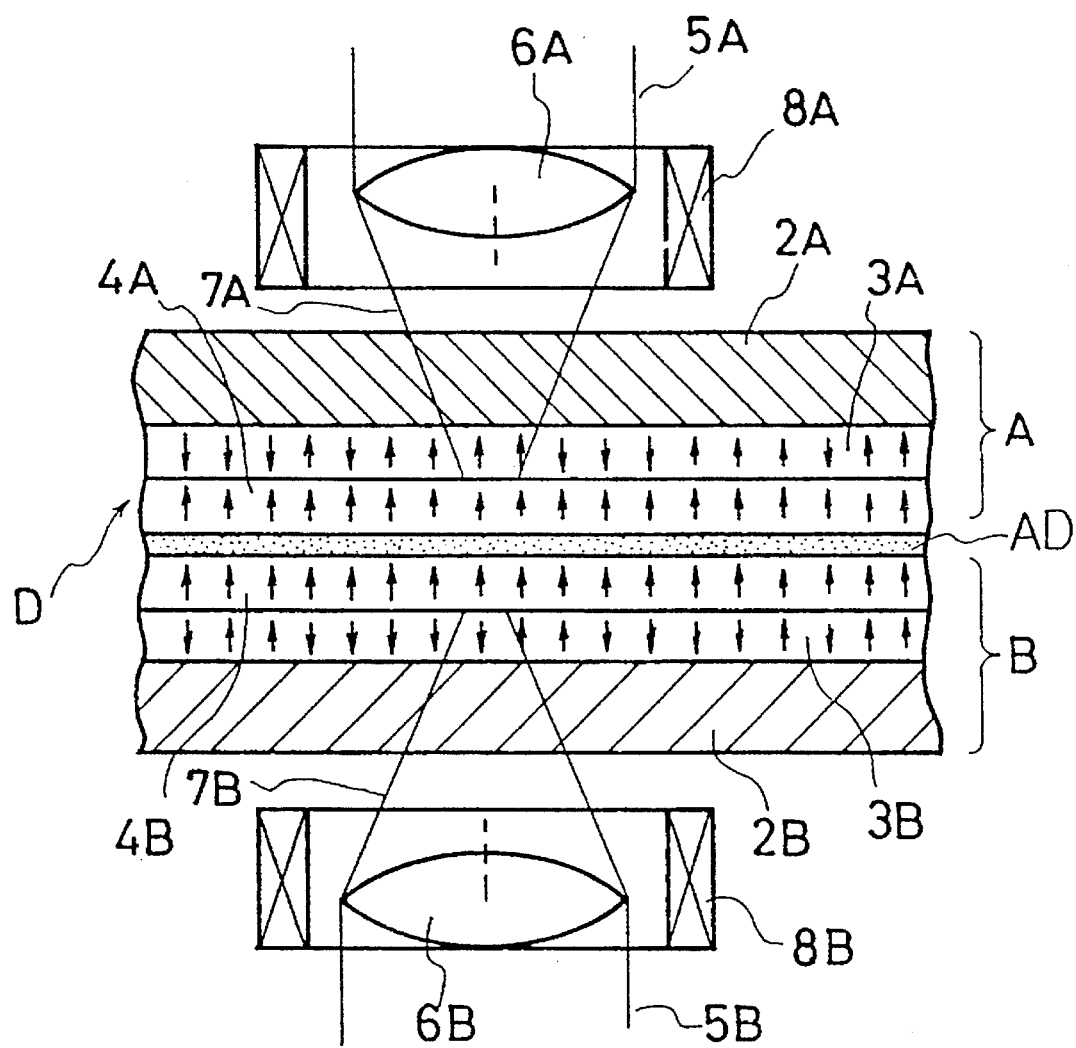
FIG. 4 is a schematic cross-sectional view of essential portions of a magneto-optic recording system in accordance with a third embodiment.

FIG. 4 is a schematic cross-sectional view of essential portions of a magneto-optic recording system using the magneto-optic recording medium D shown in FIG. 3. An unillustrated light-emitting element is provided on the unit recording medium A side (B side) which is one side (the other side) of the magneto-optic recording medium D loaded in the magneto-optic recording system, in order to record information. The arrangement is such that a beam spot 7A (7B) obtained by condensing emergent light 5A (5B) emerging from the light-emitting element by means of the objective lens 6A (6B) is projected onto the first magnetic layer 3A (3B) of the one (the other) unit recording medium A (B). In addition, a magnetic field generator 8A (8B) (a magnetic field generating means) constituted by a cylindrical coil is disposed concentrically with the objective lens 6A (6B). The directions of magnetic fields produced by the magnetic field generators 8A, 8B are respectively opposite to the directions of magnetization of the second magnetic layers 4A, 4B, as shown by the arrows, i.e., they are oriented downward, so that respective magnetic fields are imparted to the two unit recording media A, B separately. It should be noted that the magneto-optic recording medium D has the same construction as the magneto-optic recording medium D shown in FIG. 3. When recording information by using this magneto-optic recording system, the magneto-optic recording medium D is rotated, as described before. The emergent light 5A and 5B of the unillustrated two light-emitting elements is respectively condensed by the objective lenses 6A, 6B and projected onto the first magnetic layers 3A, 3B of the unit recording media A and B. Thus information is recorded simultaneously in the respective first magnetic layers 3A, 3B through the same operation as that for recording information by means of the magneto-optic recording system shown in FIG. 1.

Since this magneto-optic recording system is capable of recording information simultaneously in the two first magnetic layers 3A, 3B, the transmission rate can be enhanced. In addition, the directions (directions indicated by the broken-line arrows) of the magnetic fields generated by the magnetic field generators 8A, 8B are oriented in the same direction, and the magnetic field generators 8A and 8B are opposed to each other. Hence, the direction of the magnetic field of the magnetic field generator 8A is identical with the direction of the magnetic field of the magnetic field generator 8B, so that the magnetic fields applied to the magneto-optic recording medium D become uniform without disturbance of the magnetic fields, thereby enhancing the efficiency with which the magnetic fields are produced. Furthermore, when recording information in either of the first magnetic layers, it is unnecessary to reverse the upper and lower surfaces of the magneto-optic recording medium D for the purpose of operation. Therefore, the operation of removing and inserting the magneto-optic recording medium with respect to the magneto-optic recording system is unnecessary, so that it is possible to provide a magneto-optic recording system in which the number of handling operations is small and the operations are simple.

It should be noted that when information is recorded in the first magnetic layer 3B of the other magneto-optic recording medium B by imparting only one light beam 7A and the magnetic field of the magnetic field generator 8A, the beam spot 7A is focused and projected onto the first magnetic layer 3B of the medium B, thereby also making it possible to record information therein by the operation similar to that for recording information in the first magnetic layer 3A.

Figure 5:
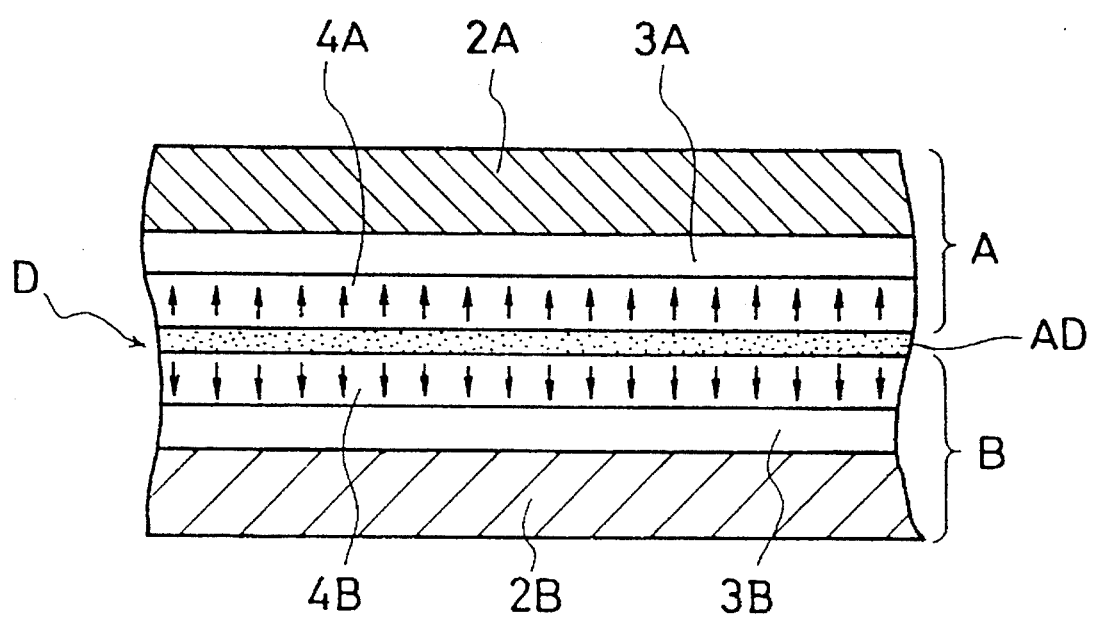
FIG. 5 is an enlarged cross-sectional view of a magneto-optic recording in accordance with a fourth embodiment.

FIG. 5 is a schematic enlarged cross-sectional view of a magneto-optic recording medium in accordance with a fourth embodiment. The magneto-optic recording medium D comprises one unit recording medium A and another unit recording medium B. Each of these unit recording media A (B) includes a substrate 2A (2B) formed of glass or a plastic, a first magnetic layer 3A (3B) formed on one surface of the substrate 2A (2B), and a second magnetic layer 4A (4B) formed on the upper surface of the first magnetic layer 3A (3B). The one unit recording medium A and the other unit recording medium B are laminated on each other via their respective second magnetic layers 4A, 4B abutting each other via the adhesive layer AD. The directions of the magnetic fields of the second magnetic layers 4A, 4B are oriented in the direction of the substrates 2A, 2B, respectively, with the result that these magnetic fields are oriented in mutually opposite directions. Both the first magnetic layers 3A, 3B and the second magnetic layers 4A, 4B exhibit vertical magnetic anisotropy in the thicknesswise direction of the layers, and the first magnetic layer 3A (3B) is coupled with the second magnetic layer 4A (4B) by means of an exchange coupling force. The directions of magnetization of the second magnetic layers 4A, 4B are not reversed during the recording or erasing of information, and are constantly held in mutually opposite directions. In addition, the Curie temperature $T_{C1}$ of the first magnetic layers 3A, 3B and the Curie temperature $T_{C2}$ of the second magnetic layers 4A, 4B are set in such a manner that $T_{C1} < T_{C2}$. If it is assumed that amounts of shift of a reversed magnetic field obtained from the exchange coupling force acting between the first and second magnetic layers 3A (3B) and 4A (4B) are $H_{W1}$, $H_{W2}$, and the bias magnetic field (Hb>0) applied to the magneto-optic recording medium D for recording information is $H_b$, then the coersive force $H_{C1}$ of the first magnetic layers 3A, 3B and the coersive force $H_{C2}$ of the second magnetic layers 4A, 4B at ordinary temperature are provided as $H_{C1} > H_{W1} + H_b$, $H_{C2} > H_{W2} + H_b$, respectively.

This magneto-optic recording medium D is arranged such that the unit recording media A, B whose second magnetic layers 4A, 4B are magnetized in the same direction are laminated on each other with the respective magnetic layers 4A, 4B abutting each other and are formed integrally via the adhesive layer AD.

When recording or erasing information on the magneto-optic recording medium D thus arranged, a light beam is projected onto the first magnetic layer 3A or 3B from one surface side or the other surface side thereof, and a magnetic field oriented in an opposite direction to the direction of magnetization of the second magnetic layer 4A or 4B is applied to the magneto-optic recording medium D from the outside. When the first magnetic layer 3A or 3B reaches the first Curie temperature at an intermediate temperature by means of the light beam, the first magnetic layer 3A or 3B is magnetized in the direction of magnetization of the second magnetic layer 4A or 4B, thereby recording information. In addition, when the first magnetic layer 3A or 3B reaches the second Curie temperature higher than the first Curie temperature, the first magnetic layer 3A or 3B is magnetized in the same direction as the direction of the magnetic field imparted to the magneto-optic recording medium D from the outside, i.e., its direction of magnetization is reversed, thereby erasing information. Thus, by reversing the direction of magnetization of the first magnetic layer 3A or 3B, it is possible to record or erase information with respect to the first magnetic layers 3A and 3B separately. Since the unit recording media A and B are laminated with the directions of magnetization of the second magnetic layers 4A, 4B set in mutually opposite directions, when recording or erasing information with respect to the first magnetic layer 3A or B of the two unit recording media A and B, it is possible to record or erase information with respect to the two first magnetic layers 3A, 3B without inverting the direction of the magnetic field imparted to the magneto-optic recording medium D by inverting the surfaces of the magneto-optic recording medium D. As a result, the amount of information that is recorded can be doubled.

Figure 6:
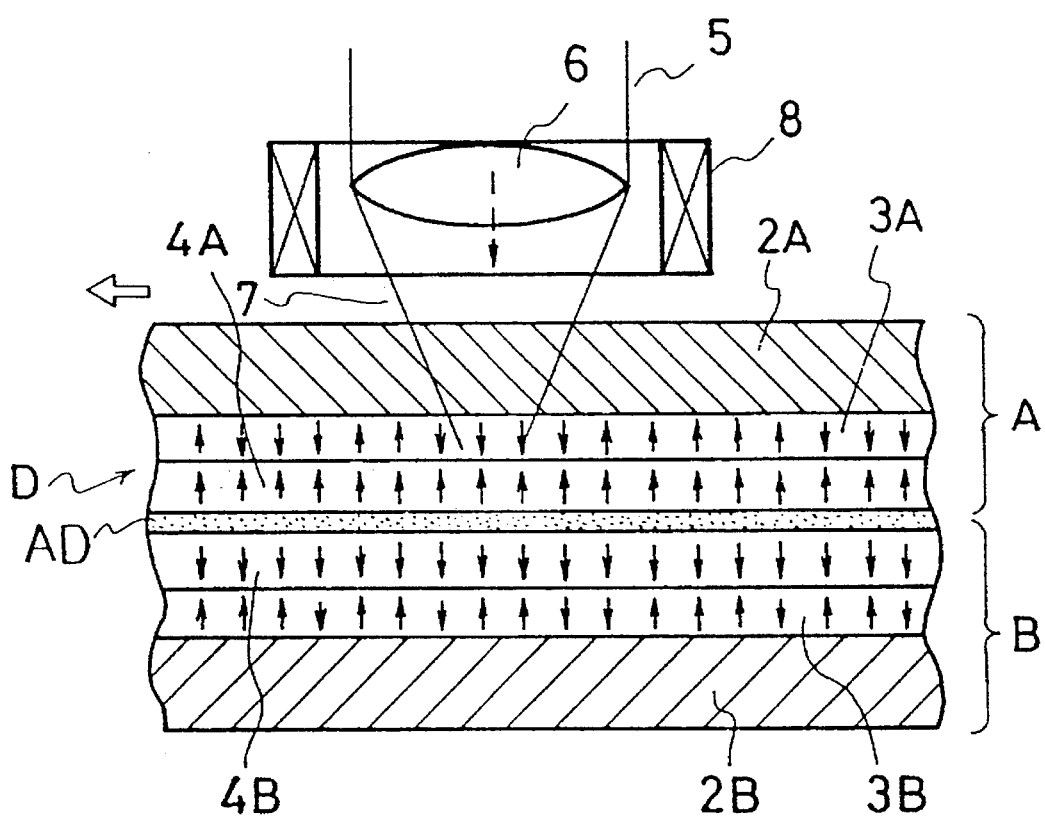
FIG. 6 is a schematic cross-sectional view of essential portions of the magneto-optic recording system in which a magneto-optic recording medium with directions of magnetization of second magnetic layers being mutually opposite to each other is employed.

FIG. 6 is a schematic cross-sectional view of essential portions of a magneto-optic recording system using the magneto-optic recording medium D wherein the directions of magnetization of its second magnetic layers 4A, 4B are opposite to each other.

This magneto-optic recording system has the same construction as that of the magneto-optic recording system in accordance with the first embodiment shown in FIG. 1. As for the magneto-optic recording medium D loaded in the magneto-optic recording system, both of the directions of magnetization of the second magnetic layers 4A, 4B are oriented toward the substrates 2A, 2B, respectively, and are opposite to each other with the unit recording media A, B laminated.

When recording information on such a magneto-optic recording medium D, information is recorded by magnetizing the first magnetic layer 3A of the unit recording medium A disposed on the projection side of the emergent light 5, in the same way as described in connection with FIG. 1.

Next, when recording information in the first magnetic layer 3B of the unit recording medium B, the magneto-optic recording medium D is drawn out temporarily from the magneto-optic recording system and is loaded in the magneto-optic recording system again after inverting the upper and lower surfaces of the magneto-optic recording medium D. Then, the projection side of the emergent light 5 is opposed to the unit recording medium B, and information is recorded in its second magnetic layer 4B in the same way as described above. Accordingly, with the magneto-optic recording medium D in which the directions of magnetization of the two second magnetic layers 4A, 4B are opposite to each other, it is necessary to effect the operation of inverting the upper and lower surfaces of the magneto-optic recording medium D. However, by using the magneto-optic recording system shown in FIG. 1, information can be recorded on the unit recording media A, B, respectively.

Referring now to FIG. 1 by way of illustration, a description will be given of the case of reproducing information. The intensity of the emergent light 5 from the light-emitting element is set to a level lower than the intermediate level $R_0$ shown in FIG. 2, and the light beam 7 is projected onto the first magnetic layer 3 of the magneto-optic recording medium D. By determining the light reflected from the first magnetic layer 3, it is possible to reproduce the recorded information. During such reproduction of information, a magnetic field may not be applied to the magneto-optic recording medium without supplying electric current to the coil. In addition, although in this embodiment the coil is used as the magnetic field generator, a yoke surrounding the outer periphery of the coil may be provided so as to enhance the efficiency with which the magnetic field is produced, thereby making it possible to reduce power consumption.

Figure 7:
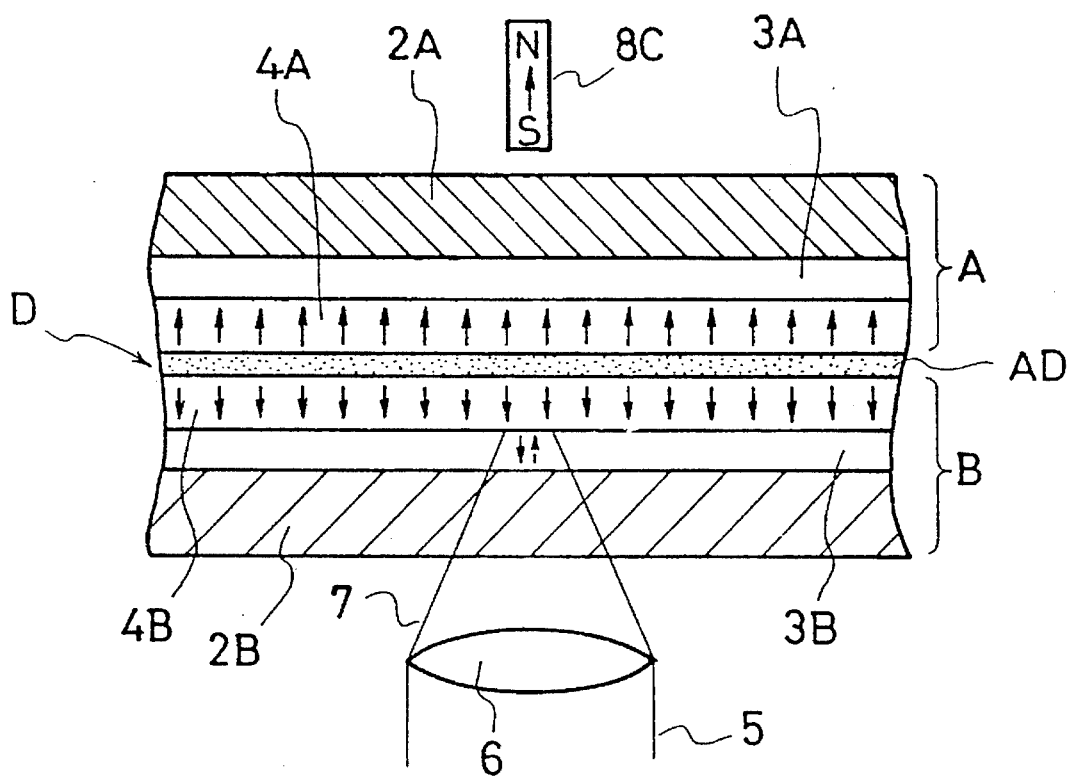
FIG. 7 is a schematic diagram of essential portions of a magneto-optic recording system in accordance with a fifth embodiment.

FIG. 7 is a schematic diagram of essential portions of a magneto-optic recording system in accordance with a fifth embodiment of the present invention.

The magneto-optic recording medium D loaded in the magneto-optic recording system is provided with an unillustrated light-emitting element on the lower surface side thereof so as to record information. The arrangement provided is such that the emergent light from the light-emitting element is condensed by the objective lens 6, and the condensed light beam spot 7 is applied to the first magnetic layer 3A or 3B of the magneto-optic recording medium D. In addition, disposed on the upper surface side of the magneto-optic recording medium D is a magnetic field generating means 8C constituted by, for instance, a bar-like permanent magnet and disposed in face-to-face relationship with the position to which the light beam spot 7 is applied. The direction of the magnetic field produced by this magnetic field generating means 8C is set to the upward direction as indicated by the arrow, i.e., in the opposite direction to the direction of magnetization of the second magnetic layer 4B to which the light beam spot 7 is being applied. That magnetic field is arranged to be applied to the magneto-optic recording medium D. It should be noted that the magneto-optic recording medium D has the same construction as that of the magneto-optic recording medium D shown in FIG. 6.

A description will now be given of the operation of magneto-optical recording by using this magneto-optic recording system. When recording or erasing information with respect to the other unit recording medium B, the magneto-optic recording medium D is loaded in the magneto-optic recording system with that side set as the side for application of the light beam spot 7, and the magneto-optic recording medium is rotated in a predetermined direction. Then the light beam spot 7 is applied to the first magnetic layer 3B of the unit recording medium B.

When erasing information (recording information "0"), i.e., when setting the direction of magnetization of the first magnetic layer 3B upward, as shown by the broken-line arrow, the intensity of the emergent light 5 from the light-emitting element is set to $R_1$, as shown in FIG. 2. Then, the portion of the first magnetic layer 3B being irradiated with the light beam spot 7 reaches a high temperature, reaching the Curie temperature $T_{C1}$. Then, when the portion of the first magnetic layer 3B to which the light beam 7 was being applied is no longer irradiated with the light beam 7 owing to the rotation of the magneto-optic recording medium D, the temperature of the first magnetic layer 3B at the position to which the light beam 7 is no longer applied drops. Now, when the first magnetic layer 3 has reached the high temperature by the irradiation, the coersive force $H_{C1}$ of the first magnetic layer 3B disappears, and the direction of magnetization of the first magnetic layer 3B becomes the direction of the bias magnetic field $H_b$ generated by the magnetic field generating means 8C, i.e., the upward direction.

Next, when recording information (recording information "1"), i.e., when setting the direction of magnetization of the first magnetic layer 3B in the downward direction indicated by the solid-line arrow, the intensity of the emergent light 5 from the light-emitting element projected onto the magneto-optic recording medium D is set to the intermediate level $R_0$, as shown in FIG. 2. Then, the portion of the first magnetic layer 3 irradiated with the light beam 7 assumes the intermediate temperature lower than the Curie temperature $T_{C1}$ of the first magnetic layer 3B. When the portion of the first magnetic layer 3B to which the light beam 7 was being applied is no longer irradiated with the light beam 7 owing to the rotation of the magneto-optic recording medium D, the temperature of the first magnetic layer 3B at the position to which the light beam 7 is no longer applied drops. Now, when the first magnetic layer 3 has reached the intermediate temperature $R_0$, the coersive force $H_{C1}$ of the first magnetic layer 3B drops, is subjected to the influence of the exchange coupling force, and the direction of magnetization of the first magnetic layer 3B becomes the direction in which the exchange coupling force is acting, i.e., the downward direction which is the direction of the second magnetic layer 4B. Next, when recording information in the first magnetic layer 3A of the upper unit recording medium A, the loaded magneto-optic recording medium D is drawn out from the magneto-optic recording system, and is loaded again after its upper and lower surfaces are inverted. Then, that unit recording medium A is positioned on the side where the light beam spot is applied. When the light beam spot 7 is applied to the first magnetic layer 3A, and information is recorded or erased with respect to the first magnetic layer 3A by the same operation as that for recording or information with respect to the aforementioned first magnetic layer 3B.

Figure 8:
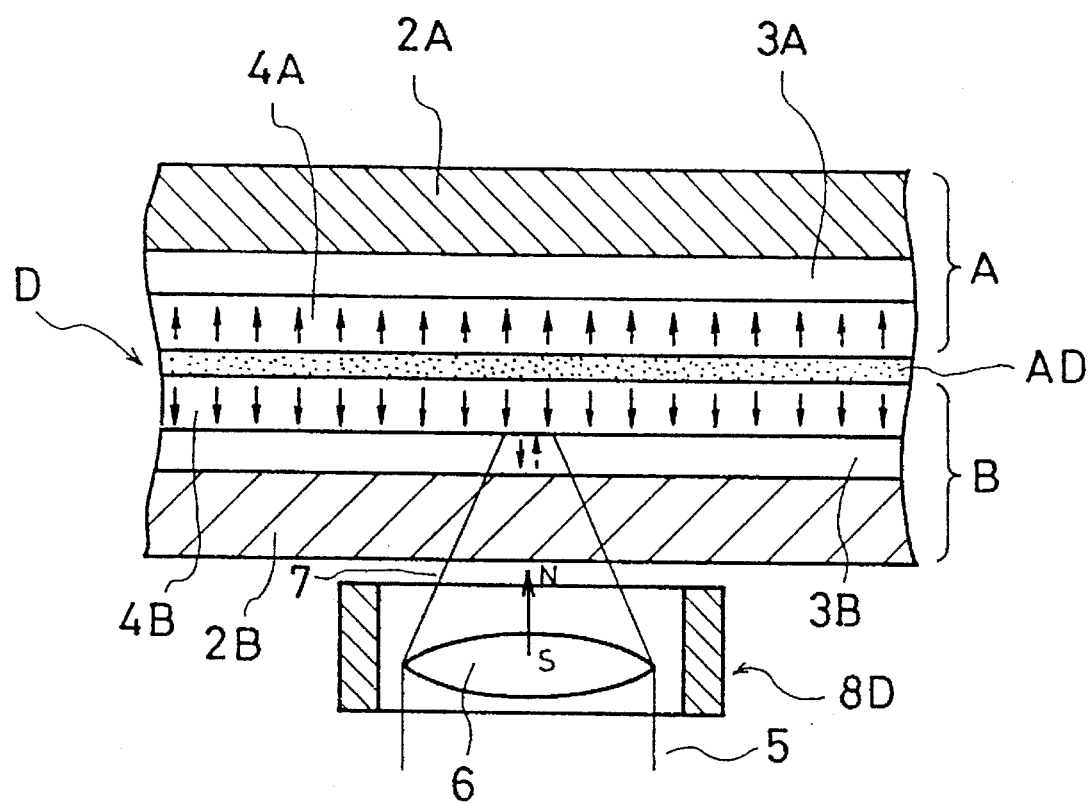
FIG. 8 is a schematic diagram of essential portions of a magneto-optic recording system in accordance with a sixth embodiment.

FIG. 8 is a schematic diagram of a magneto-optic recording system in accordance with a sixth embodiment in which a magnetic field generating means 8D is provided on the side where the light beam spot 7 is made to issue. In this embodiment, the magnetic field generating means 8D constituted by a short cylindrical permanent magnet is disposed around the outer periphery of the objective lens 6 concentrically with the objective lens 6. The direction of the magnetic field generated by the magnetic field generating means 8D is set to be opposite to the direction of magnetization of the second magnetic layer 4B (4A) disposed on the side where light beam is made to issue.

With the magneto-optic recording system thus arranged as well, it is possible to record and erase information in the same way as the case where the magnetic field generating means 8C is provided on the side of the magneto-optic recording medium D which is away from the side where the light beam spot 7 is made to issue.

When recording or erasing information with respect to the two first magnetic layers 3A, 3B separately, it suffices to invert the surfaces of the magneto-optic recording medium D and it is not necessary to reverse the direction of the magnetic field generated by the magnetic field generating means 8C or 8D. Therefore, it suffices to fix the direction of magnetization of the magnetic field generating means 8C or 8D in one direction, so that the structure of the magnetic field generating means can be simplified.

In addition, in cases where the magnetic field generating means 8C or 8D is provided on the side where the light beam spot 7 is made to issue, the space for providing the magnetic field generating means is not required for the other side of the magneto-optic recording medium D. Hence, the magneto-optic recording system can be made compact.

Figure 9:
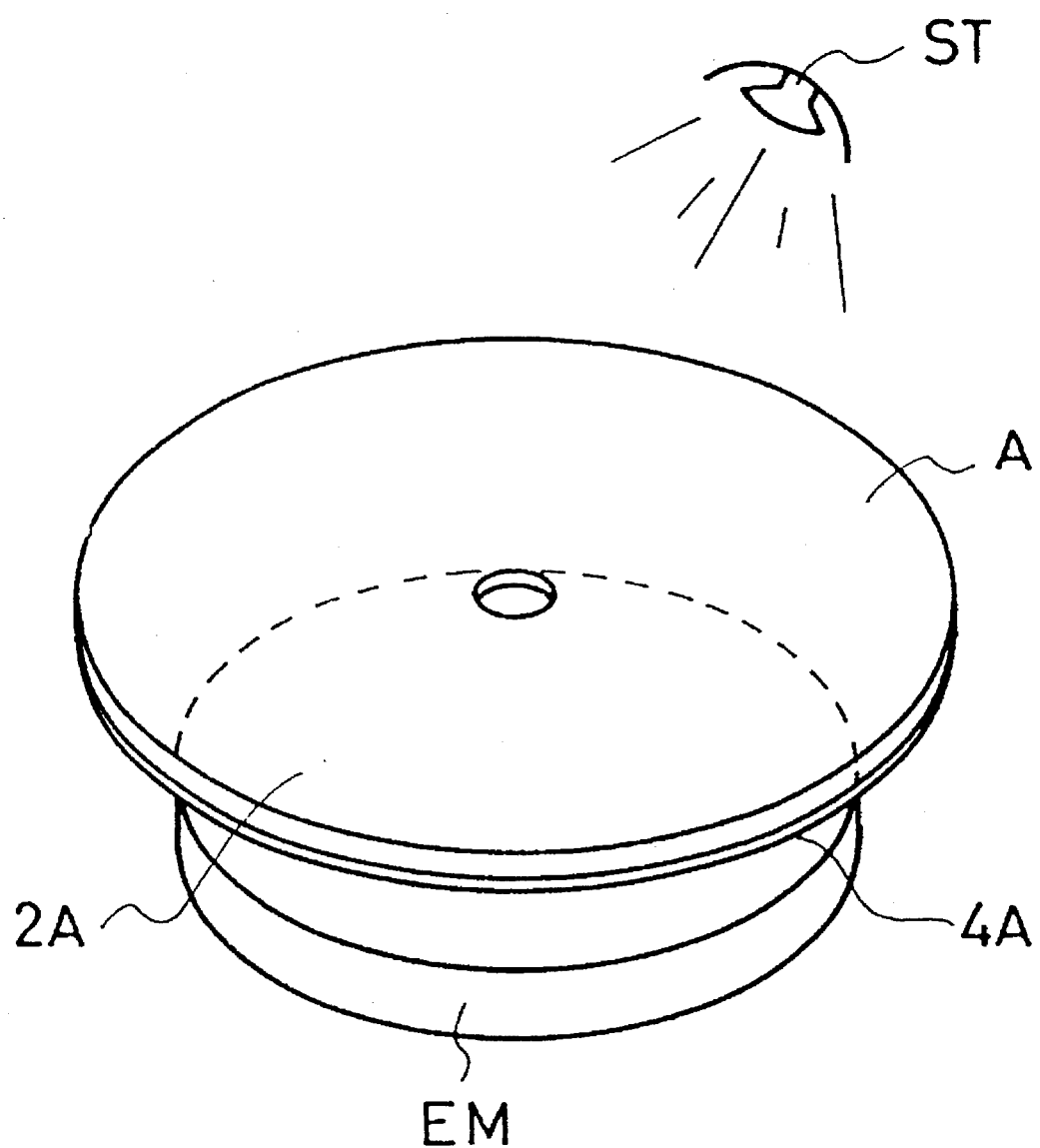
FIG. 9 is a perspective view illustrating a method of manufacturing a unit recording medium.

FIG. 9 is a perspective view illustrating a method of manufacturing the unit recording medium A or B.

For instance, the unit recording medium A is placed with its second magnetic layer 4A to be magnetized facing downward, and a magnetizing means EM constituted by, for example, an electromagnet and adapted to impart a unidirectional magnetic field to the unit recording medium A is disposed below the unit recording medium A. Meanwhile, a heating means ST constituted by, for instance, a stroboscopic light-emitting device is provided above the unit recording medium A so as to increase the overall temperature of the unit recording medium A to a high temperature.

In other words, the unit recording medium A before fabrication of the magneto-optic recording medium D is heated from above the unit recording medium A up to the Curie temperature or more of the first magnetic layer by the use of the heating means ST. At the same time, a magnetic field oriented toward, for instance, the substrate 2A is imparted to the unit recording medium A from therebelow by means of the magnetizing means EM. Then, the second magnetic layer 4A reaches the high Curie temperature, and the direction of magnetization of the second magnetic layer 4A is set to one direction. Subsequently, by stopping the heating by the heating means ST, the temperature of the unit recording medium A drops, and the direction of magnetization of the second magnetic layer 4A is held in the one direction. Thus the unit recording medium (the magneto-optic recording medium D), such as the medium shown in FIG. 1, in which the direction of magnetization is oriented toward the substrate 2A is fabricated. Next, a new unit recording medium having the second magnetic layer is disposed and heated in the same way as described above, and a unidirectional magnetic field is imparted thereto, thereby fabricating the unit recording medium B, such as the medium shown in FIG. 1, which is magnetized in the same way as the unit recording medium A. In other words, the unit recording media A, B are fabricated into identical contents under the same conditions. Subsequently, the unit recording media A and B thus fabricated are laminated together so as to be formed integrally with their respective second magnetic layers 4A, 4B abutting each other via the adhesive layer AD. Thus, the magneto-optic recording medium D, such as the one shown in FIG. 3, 4, 5, 6, 7 or 8 having the two unit recording media A, B is manufactured.

When manufacturing the magneto-optic recording media D in this manner, it is possible to magnetize the individual second magnetic layers within a short period of time by consecutively heating the unit recording media and imparting a magnetic field of the same direction thereto. Thus it is possible to fabricate a plurality of unit recording media A, B continuously, thereby making it possible to enhance the productivity thereof.

It should be noted that although the direction of magnetization of the second magnetic layer of each unit recording medium is set to the direction oriented toward the substrate 2A or 2B, the direction concerned may be set to the one oriented toward the adhesive layer AD.

Figure 10:
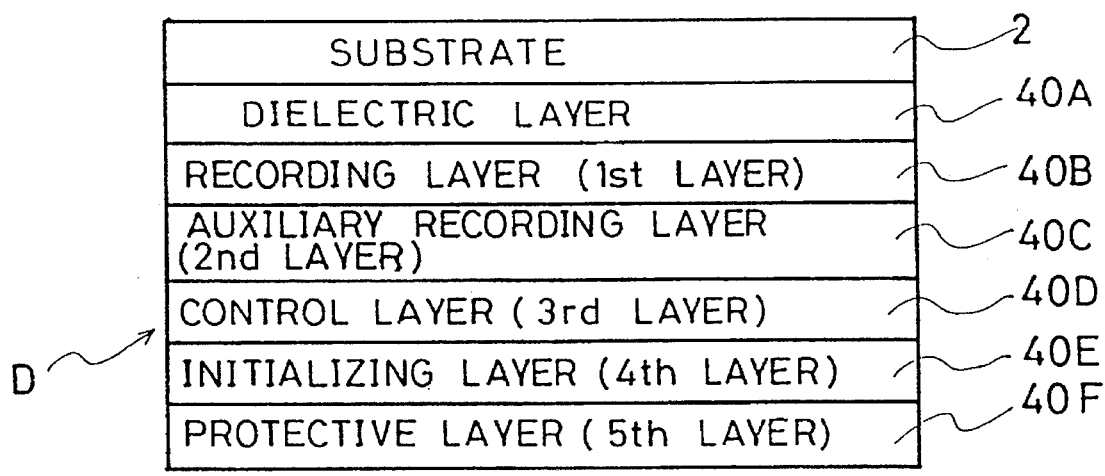
FIG. 10 is an enlarged cross-sectional view of a magneto-optic recording medium having four magnetic layers.

FIG. 10 is a schematic enlarged cross-sectional view of a magneto-optic recording medium in accordance with a further embodiment of the invention, in which four magnetic layers are provided.

This magneto-optic recording medium D has a dielectric layer 40A disposed on the substrate 2 formed of, for instance, glass. A recording layer 40B, an auxiliary recording layer 40C, a control layer 40D, an initializing layer 40E, and a protective layer 40F are laminated on the dielectric layer 40A in that order. It should be noted that the recording layer 40B (first layer) and the initializing layer 40E (fourth layer) have the same functions as those of the first magnetic layers 3A, 3B and second magnetic layers 4A, 4B of the magneto-optic recording medium described above.

Each of the layers is formed by sputtering or other similar process with the materials and thicknesses, for instance, shown in Table 1 below.

TABLE 1

| Layer | Material | Thickness |
|---|---|---|
| Dielectric layer 40A | $SiN_x$ | 65 nm |
| Recording layer 40B | $Tb_{22}Fe_{69}Co_9$ | 80 nm |
| Auxiliary recording layer 40C | $Gd_8Dy_{17}Fe_{60}Co_{15}$ | 150 nm |
| Control layer 40D | $Tb_{30}Fe_{84}$ | 20 nm |
| Initializing layer 40E | $Tb_{30}Co_{70}$ | 40 nm |
| Protective layer 40F | $SiN_x$ | 70 nm |

These magnetic layers have the following characteristics: Adjacent magnetic layers are coupled with each other by means of the exchange force. The recording layer (first layer) 40B effects the recording and holding of information. The auxiliary recording layer (second layer) 40C, the control layer (third layer) 40D, and the initializing layer (fourth layer) 40E do not have the function of holding information and are additional layers permitting direct overwriting through optical modulation. The initializing layer 40E does not undergo a reversal of auxiliary-lattice magnetization within its temperature range with respect to a temperature rise due to irradiation with a laser beam and serves to oppose a bias magnetic field. The control layer 40D serves to interrupt an exchange force from the initializing layer 40E in a high-temperature range.

Figure 11A:
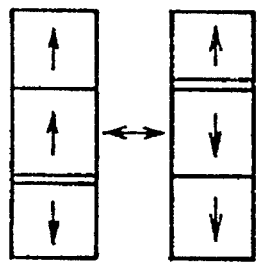
FIG. 11A & 11B is a conceptual diagram illustrating auxiliary-lattice magnetization.
Figure 11B:
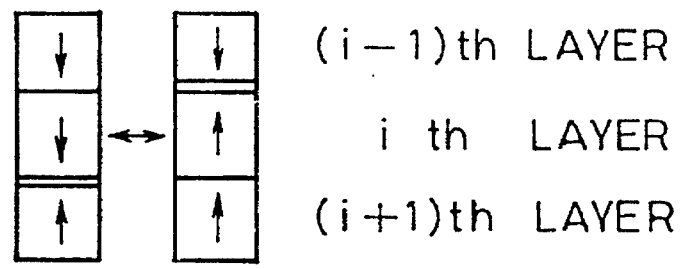
Figure 12:
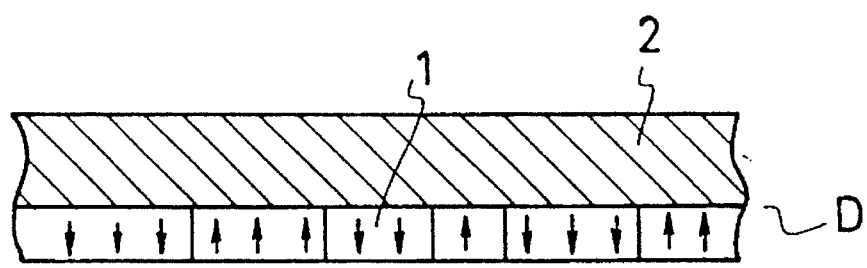
FIG. 12 is an enlarged cross-sectional view of a conventional magneto-optic recording medium.
Figure 14:
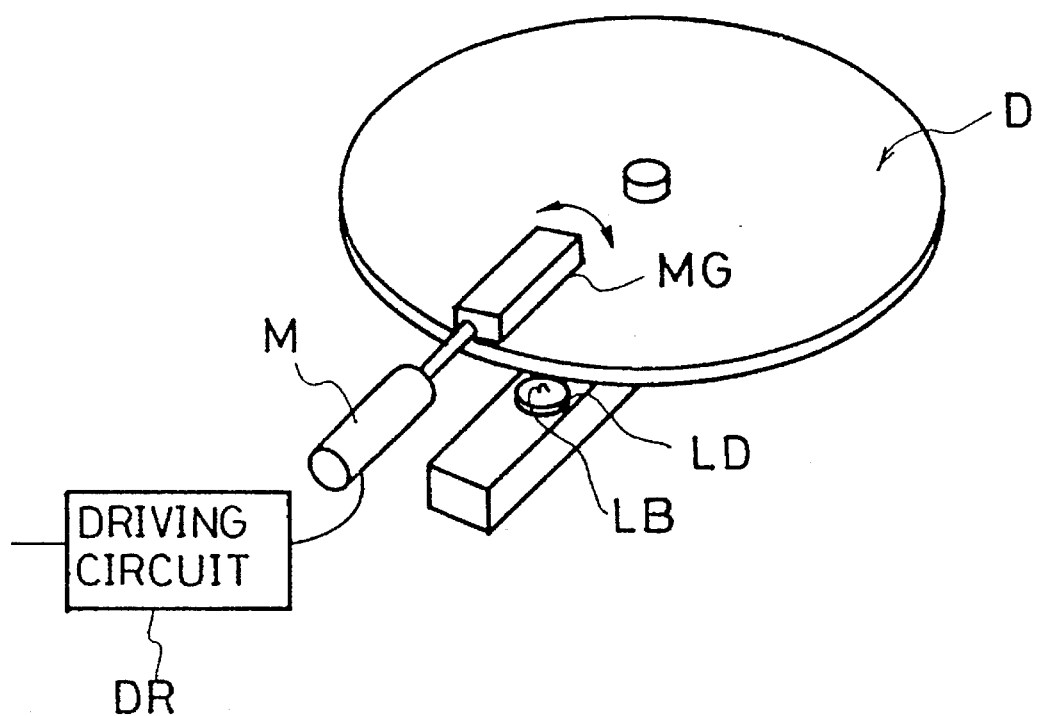
FIGS. 14 and 15 are schematic perspective views of essential portions of conventional magneto-optic recording systems, respectively.
Figure 13:
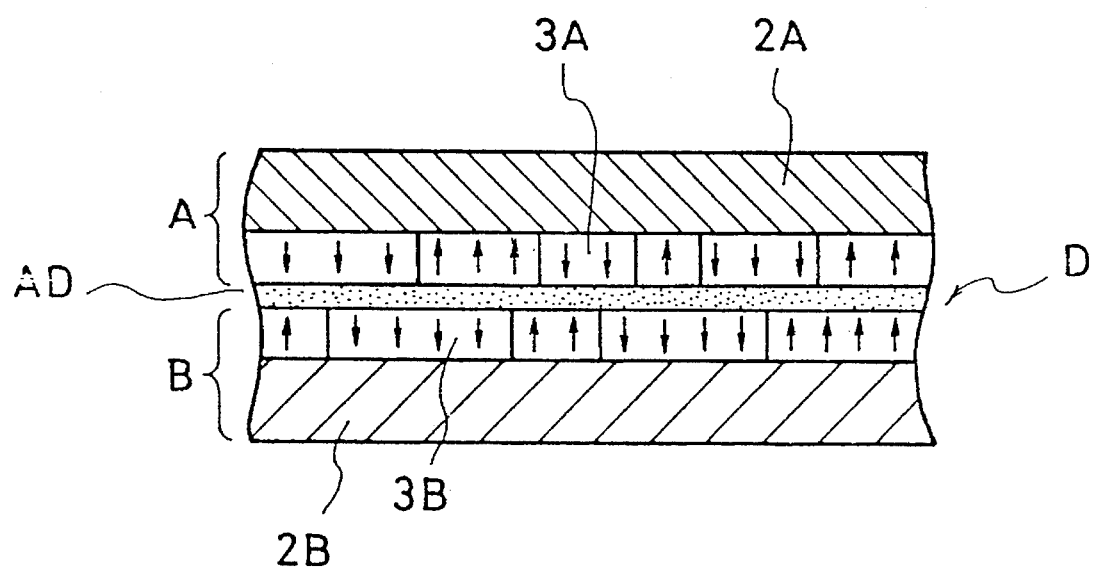
FIG. 13 is an enlarged cross-sectional view of another conventional magneto-optic recording medium.
Figure 15:
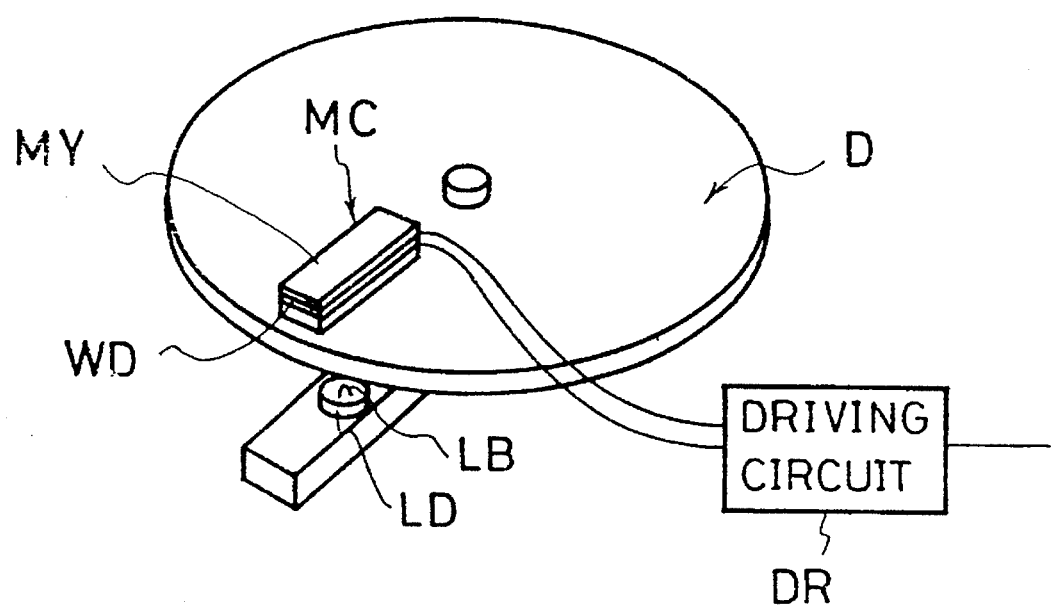
Figure 16:
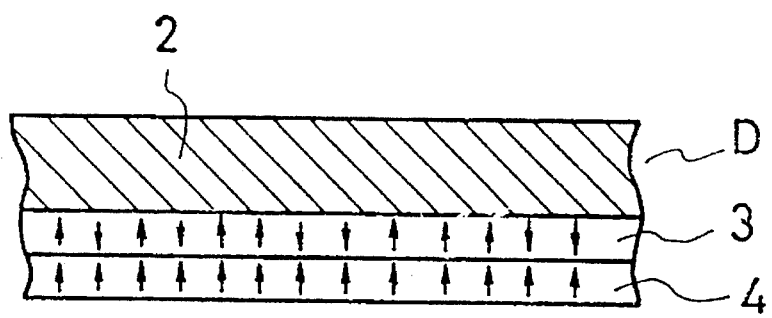
FIG. 16 is an enlarged cross-sectional view of still another conventional magneto-optic recording medium.

Here, it is assumed that $T_{Ci}$ is the Curie temperature of an i-th layer (where i=1, 2, 3 or 4), that $H_{Ci}$ is the width of a magnetic field (corresponding to a coersive force) which is half that of a reversed magnetic field of the i-th layer, and that $H_{Wi}$ is an exchange force to which the i-th layer receives from the adjacent magnetic layer (this exchange force corresponds to the transition width of a loop in the i-th layer and is defined for a reversal of magnetization as shown in FIG. 11 with respect to the second and third layers).

FIG. 11 shows a conceptual diagram of auxiliary-lattice magnetization. Here, if the i-th layer is assumed to be, for instance, the third layer, the directions of the third layer and layers adjacent thereto, i.e., the second and fourth layers, are shown in the part (a) or (b) of FIG. 11. In addition, in cases where the direction of magnetization of the i−1 layer and the direction of magnetization of the i+1 layer are mutually opposite to each other, as shown in the part (a) of FIG. 11, the direction of magnetization of the i-th layer becomes that of the i−1 layer or the i+1 layer. Meanwhile, in cases where the direction of magnetization of the i−1 layer and the direction of magnetization of the i+1 layer are mutually approaching directions, the direction of magnetization of the first layer becomes oriented toward the i+1 layer or the i−1 layer.

After having thus defined, the magnetization characteristics are given as $$T_{c4}>(T_{comp4})>T_{C2}>T_{CI}>(T_{comp2})>T_{C3}>\text{room temperature} \quad (1)$$

Recording layer 40B:

$$H_{W1}<H_{C1}: \text{up to room temperature} \quad (2)$$

$$H_{W1}>H_{C1}: \text{up to } T_{CI} \quad (3)$$

Auxiliary recording layer 40C:

$$H_{W2}>H_{C2}: \text{up to } T_{C3} \quad (4)$$

$H_{w2} < H_{C2}$: up to $T_{C1}$    (5)

Control layer 40D:

$H_{w3} > H_{C3}$: up to $T_{C3}$    (6)

Initializing layer 40E:

$H_{w4} < H_{C4}$: up to an operating temperature range    (7)

(where $T_{comp2}$ and $T_{comp4}$ are compensation temperatures for the second and fourth layers). Formula (2) shows that the magnetization of the recording layer 40B at room temperature is not reversed by the reversal of magnetization of the auxiliary recording layer 40C. Formulae (4), (6) and (7) show that the directions of magnetization of the auxiliary recording layer 40C, the control layer 40B, and the initializing layer 40E at room temperature are uniformly oriented downward after recording.

If a magneto-optic recording system using this magneto-optic recording medium having four magnetic layers is arranged in the same manner as the magneto-optic recording systems of the other embodiments, it is possible to obtain a similar advantage.

In addition, it is also possible to obtain a similar advantage if this embodiment is applied to a magneto-optic recording and reproducing system.

What is claimed is:

1. A magneto-optic recording system comprising:

a magneto-optic recording medium in which first and second magnetic layers exhibit magnetic anisotropy and are laminated and bonded together by an exchange coupling force on a substrate, the first and second magnetic layers being arranged to satisfy the following three conditions:

$Tc1 < Tc2$, $Hc1 > Hw1 + Hb$, and $Hc2 > Hw2 + Hb$;

wherein Tc1 is the Curie temperature of the first magnetic layer, Hc1 the coercive force of the first magnetic layer at normal temperature, Hw1 the exchange coupling force of the first magnetic layer with the second magnetic layer, Tc2 the Curie temperature of the second magnetic layer, Hc2 the coercive force of the second magnetic layer, Hw2 the exchange coupling force of the second magnetic layer with the first magnetic layer, and Hb a non-zero bias magnetic field at the time of recording information, the second magnetic layer being fixedly magnetized in a magnetization direction substantially perpendicular to and either oriented towards the substrate or oriented away from the substrate, and the magnetization direction of the first magnetic layer being reversed at the time of recording;

light beam projecting means disposed in a position to direct a light beam through the substrate to a spot on the first magnetic layer from the substrate side of the magneto-optic recording medium and having light beam intensity control means for projecting a plurality of light beams having different intensities; and magnetic field generating means disposed in a position on the substrate side of the magneto-optic recording medium for generating a magnetic field at the spot in a direction opposite to the magnetization direction of the second magnetic layer so that the magnetization direction of the second magnetic layer is not reversed at the time of recording information on the recording medium.

2. A magneto-optic recording system comprising:

a magneto-optic recording medium consisting of a laminate of two unit recording media, each having first and second magnetic layers which exhibit magnetic anisotropy and are bonded together by an exchange coupling force on a substrate, the second magnetic layers being bonded together with an adhesive layer therebetween, the first and second magnetic layers being arranged to satisfy the following three conditions;

$[Tc1 > Tc2,] Tc1 < Tc2$, $Hc1 > Hw1 + Hb$, and $Hc2 > Hw2 + Hb$, wherein Tc1 is the Curie temperature of the first magnetic layer, Hc1 the coercive force of the first magnetic layer at normal temperature, Hw1 the exchange coupling force of the first magnetic layer with the second magnetic layer, Tc2 the Curie temperature of the second magnetic layer, Hc2 the coercive force of the second magnetic layer, Hw2 the exchange coupling force of the second magnetic layer with the first magnetic layer, and Hb a non-zero bias magnetic field at the time of recording information, the second magnetic layers being fixedly magnetized in a magnetization direction substantially perpendicular to and either oriented towards the substrate or oriented away from the substrate, but both second magnetic layers having the same direction, and the magnetization direction of the first magnetic layer of each unit recording medium being reversed at the time of recording;

a pair of light beam projecting means, each disposed in a position to direct a light beam through the substrate to a spot on the first magnetic layer from the substrate side of each of the unit recording media and having light beam intensity control means for projecting a plurality of light beams having different intensities onto the recording medium; and a pair of magnetic field generating means, each disposed in a position on the substrate side of each of the unit recording media for generating a magnetic field at the spot in a direction opposite to the magnetization direction of the second magnetic layer so that the magnetization direction of the second magnetic layer of each unit recording medium is not reversed at the time of recording information on the recording medium, each of the magnetic field generating means generating a magnetic field in a direction opposite to each other.

3. A magneto-optic recording system comprising:

a magneto-optic recording medium consisting of a laminate of two unit recording media, each having first and second magnetic layers which exhibit magnetic anisotropy and are bonded together by an exchange coupling force on a substrate, the second magnetic layers being bonded together with an adhesive layer therebetween, the first and second magnetic layers being arranged to satisfy the following three conditions;

$[Tc1 > Tc2,] Tc1 < Tc2$, $Hc1 > Hw1 + Hb$, and $Hc2 > Hw2 + Hb$, wherein Tc1 is the Curie temperature of the first magnetic layer, Hc1 the coercive force of the first magnetic layer at normal temperature, Hw1 the exchange coupling force of the first magnetic layer with the second magnetic layer, Tc2 the Curie temperature of the second magnetic layer, Hc2 the coercive force of the second magnetic layer, Hw2 the exchange coupling force of the second magnetic layer with the first magnetic layer, and Hb a non-zero bias magnetic field at the time of recording information, the second magnetic layers being fixedly magnetized in a magnetization direction substantially perpendicular to and either oriented towards the substrate or oriented away from the substrate, but the second magnetic layers having directions opposite to each other, and the magnetization direction of the first magnetic layer of each of the unit recording media being reversed at the time of recording;

light beam projecting means disposed in a position to direct a light beam through the substrate to a spot on the first magnetic layer from the substrate side of at least one of the unit recording media and having light beam intensity control means for projecting a plurality of light beams having different in intensity onto the unit recording medium; and magnetic field generating means disposed in a position on the substrate side of at least one of the unit recording media for generating a magnetic field at the spot in a direction opposite to the magnetization direction of the magnetic layer so that the magnetization direction of the second magnetic layer of each of the unit recording media is not reversed at the time of recording information on the recording medium.

* * * * *